United States Patent

Sasaki et al.

[11] Patent Number: 5,747,631
[45] Date of Patent: May 5, 1998

[54] PRECURSOR OF AMORPHOUS CARBON MOLDED ARTICLE

[75] Inventors: Shingo Sasaki; Mutsunori Yamao, both of Kyoto, Japan

[73] Assignee: Unitika Ltd., Hyogo, Japan

[21] Appl. No.: 272,850

[22] Filed: Jul. 11, 1994

[30] Foreign Application Priority Data

Aug. 11, 1993 [JP] Japan ................................. 5-220706

[51] Int. Cl.$^6$ ................................................ C08G 18/32
[52] U.S. Cl. ........................... 528/86; 528/480; 528/502; 528/503; 264/77; 264/239
[58] Field of Search ........................... 528/129, 86, 480, 528/502, 503; 264/77, 239

[56] References Cited

U.S. PATENT DOCUMENTS 4,880,893  11/1989  Waitkus ................................. 528/129

FOREIGN PATENT DOCUMENTS

| 53-43191   | 6/1977  | Japan. |  |
|---|---|---|---|
| 53-126095  | 11/1978 | Japan. |  |
| 1-38816    | 8/1989  | Japan. |  |
| 3-119723   | 5/1991  | Japan. |  |
| 3-285086   | 12/1991 | Japan. |  |
| 06206957   | 7/1994  | Japan. |  |
| 1419663    | 12/1975 | United Kingdom | .................. 528/129 |

*Primary Examiner*—Duc Truong
*Attorney, Agent, or Firm*—Sughrue, Mion, Zinn, Macpeak & Seas, PLLC

[57] ABSTRACT

A phenolic resin molding material for molding a precursor of an amorphous carbon molded article which comprises a particulate phenolic resin having thermal plasticity coated with a low-surface tension substance containing no metallic substance; a transparent precursor of an amorphous carbon molded article which comprises a homogeneous phenolic resin homogenized by molding under a highly flowing state and has few large voids and a low metal content; a process for molding the precursor which comprises molding the phenolic resin molding material with its water content being controlled by molding, i.e., kneading followed by shaping under a highly flowing state, such as transfer molding, extrusion, injection molding or injection compression molding; and a process for producing an amorphous carbon molded article which comprises carbonizing the precursor by burning.

The amorphous carbon molded article produced by the present invention is suitably used as crecibles or Raschig rings in the fields of metallurgical and chemical industries, and as plasma etchers, susceptors or substrates of electronic parts in the electronic industry field.

4 Claims, No Drawings

PRECURSOR OF AMORPHOUS CARBON MOLDED ARTICLE

FIELD OF THE INVENTION

This invention relates to a precursor which can be used in the production of a high performance amorphous carbon molded article, a process for molding the precursor, a resin molding material used in the molding of the precursor, and a process for producing an amorphous carbon molded article from the precursor.

BACKGROUND OF THE INVENTION

Amorphous carbon molded articles are widely used, for example, as crucibles or Raschig rings in the fields of metallurgical and chemical industries for their impermeability and chemical stability, and as plasma etchers, susceptors, or substrates of electronic parts in the electronic industry for their high purity and excellent electrical characteristics.

Amorphous carbon molded articles are usually obtained by burning into carbonization of a precursor of amorphous carbon molded articles (hereinafter simply referred to as a precursor) which comprises a non-thermoplastic polymer, such as cellulose, or a thermosetting resin, such as a phenolic resin or a furan resin.

Of these resin materials for preparing a precursor, phenolic resins have been used most often because they are easy to carbonize, exhibit high efficiency in burning, and provide high performance carbon moldings.

A precursor comprising a phenolic resin is generally produced by a composite thermosetting resin molding method, in which a liquid phenolic resin combined with a reinforcing material or a filler, such as paper, cloth, glass fiber or an inorganic filler, is molded and heated to cure. However, the amorphous carbon molded article obtained by burning the thus prepared precursor in vacuo or in an inert gas atmosphere unavoidably contains voids and has poor adhesion on the interface between amorphous carbon (a thermal decomposition product of the phenolic resin) and the reinforcing material or filler. Thus, this conventional method cannot be expected to provide an amorphous carbon molded article with excellent characteristics and has not been utilized for the production of high performance carbon moldings.

In recent years, a new method of molding a phenolic resin has arisen, in which a particulate phenolic resin molding material having thermal plasticity is molded under a highly flowing state by transfer molding, injection molding, injection compression molding or extrusion as well as conventionally employed compression molding (hot press molding), as disclosed, e.g., in JP-B-53-43191 (the term "JP-B" as used herein means an "examined Japanese patent publication").

Compared with conventional thermoplastic resins, phenolic resins still have considerably poor moldability even when molded by the above-mentioned new method. For the time being, satisfactory molded articles for practical use cannot be obtained unless the molding material is compounded with a fibrous reinforcing material, such as glass fiber, or a metal-containing organic lubricant, such as zinc stearate, as described in JP-B-1-38816.

That is, a phenolic resin molding material containing neither fibrous reinforcing material nor metal-containing organic lubricant loses its fluidity in a cylinder of a molding machine when subjected to molding, making it difficult to carry on molding in a stable manner and with high accuracy.

On the other hand, amorphous carbon molded articles have extended their application to a substrate of electronic parts, taking advantage of their high performance. The amorphous carbon molded articles for this application are particularly required to have excellent surface properties. For example, a plate molded article for use as a magnetic disc should have excellent surface smoothness, and the surface of the molded article is subjected to precise polishing to obtain such smoothness. In this case, since void (entrapped air bubbles), impurities, and localized metals would appear as defects on the polished surface, such causes of surface defects are removed so as to achieve high quality. However, whichever molding method may be adopted, incorporation of air bubbles into the conventional phenolic resin moldings has not been eliminated to a satisfactory degree. Further, the aforesaid causes of defects unavoidably occur during a polymerization process and a molding process. For these reasons, phenolic resins have not been used as a precursor material for high performance amorphous carbon molded articles.

Where a highly pure particulate molding material having thermal plasticity is compression molded, an amorphous carbon molded article with less defects is obtained. However, compression molding not only has a limit on shape of moldings obtained, but requires long cycling time, so the resulting molded articles become expensive.

SUMMARY OF THE INVENTION

An object of the present invention is to provide a precursor of a high performance amorphous carbon molded article; a process for molding a precursor; a molding material which can be used for producing the precursor; and a process for producing a high performance amorphous carbon molded article by using the precursor.

An important aspect of the present invention resides in (1) a transparent precursor of an amorphous carbon molded article, which comprises a homogeneous phenolic resin homogenized by molding under a highly flowing state and having a small number of large voids and low metal content; (2) a phenolic resin molding material for molding the precursor, which comprises a particulate phenolic resin having thermal plasticity, coated with a low-surface tension substance containing no metallic substance; (3) a process for molding the precursor, which comprises molding the phenolic resin molding material by molding under a highly flowing state, such as transfer molding, extrusion, injection molding or injection compression molding; and (4) a process for producing an amorphous carbon molded article, which comprises carbonizing the precursor by burning at a specific temperature in a specific atmosphere.

The amorphous carbon molded article obtained by the process of the present invention contains substantially no large voids, has an extremely low metal content, and shows homogeneity both on its surface and on its inside. It exhibits excellent characteristics, such as high purity, chemical resistance, rigidity, dimensional stability, and gas impermeability, excellent processability on surface finishing, such as polishing, and uniform and stable etchability with plasma. Additionally, it can be produced at high productivity (at low cost) with high precision and high quality. Accordingly, it is suited for a wide variety of applications as, for example, crucibles or Raschig rings in the metallurgical and chemical industries and as plasma etchers, susceptors or substrates of electronic parts in the electronic industry.

The present invention provides (1) a precursor of an amorphous carbon molded article, which comprises a homogeneous phenolic resin homogenized by molding under a highly flowing state and having a light transmittance of not less than 80% per mm of optical pass of visible light having a wavelength of 800 nm, less than one void having a diameter of 100 µm or greater per cm$^3$, and a metal content of not more than 200 ppm by weight; (2) a phenolic resin molding material for molding the above-mentioned precursor, which comprises a particulate phenolic resin having a particle size of not less than 50 µm and a thermal plasticity of from 60 to 160 mm, as measured by the disc cure method, the individual particles thereof being coated with 0.2 to 5% by weight, based on the phenolic resin, of a low-surface tension compound having a melting point of from 30° to 160° C.; (3) a process for producing the above-mentioned precursor, which comprises molding the above-mentioned phenolic resin molding material, with its water content being controlled to 1% by weight or less, by transfer molding, injection molding, injection compression molding or extrusion; and (4) a process for producing an amorphous carbon molded article, which comprises carbonizing a precursor obtained by the above-mentioned molding process by burning at a temperature of from 500° to 3000° C. in vacuo or in an inert gas atmosphere.

DETAILED DESCRIPTION OF THE INVENTION

The terminology "amorphous carbon comprising a thermal decomposition product of a phenolic resin" as used herein means a thermal decomposition carbonized product obtained by burning into carbonization of a molded article comprising a phenolic resin at a heating temperature of from 500° to 3000° C. in vacuo or in an inert gas atmosphere, which is a highly dense, isotropic, and amorphous carbon material.

The amorphous carbon molded article according to the present invention is described in detail hereinafter.

The amorphous carbon molded article should comprise at least 95% by weight of amorphous carbon. If the proportion of amorphous carbon is less than 95%, the purity of the carbonaceous material is insufficient for assuring electrical characteristics, such as insulating properties, breakdown strength, and dielectric constant; chemical characteristics, such as chemical resistance; and mechanical properties, such as hardness and impact resistance.

Since existence of metallic substances in an amorphous carbon molded article greatly influences the characteristics of the article, the total content of metallic substances should be minimized.

The terminology "metallic substances" as used herein inclusively means simple metals and compounds containing a metallic element, such as metallic compounds or inorganic metal salts (e.g., oxides, carbides, metal/carbon interlaminar compounds, sulfides, sulfates, sulfites, and hydroxides), organometallic salts, metal complexes, organometal complexes, and the like. After carbonization of this precursor, these substances, if present in a carbon matrix in any form, e.g., dispersed, dissolved, or intercalated, become fine metal oxides contaminated in the carbon material or localized metallic compounds such as metal carbides, which make the surrounding carbon heterogeneous, causing defects.

The metal content in the amorphous carbon molded article of the present invention should be 300 ppm by weight at the most as converted to metal(s). If the metal content exceeds 300 ppm, the electrical and mechanical characteristics as referred to earlier are considerably impaired. In particular, where the amorphous carbon molded article is polished for some specific uses as hereinafter described, the surface smoothness of the polished surface would be considerably reduced.

Existence of voids also causes defects. In particular, large voids having a diameter of 100 µm or greater lead to serious defects. Such large voids are often attributed to the voids which have been already formed in the phenolic resin molded article before carbonization. Therefore, a precursor having many large voids of that size fails to provide an amorphous carbon molded article having the desired properties achieved by the present invention.

As long as the number of the large voids having a diameter of 100 µm or greater on the surface of an amorphous carbon molded article is less than 1 per cm$^2$, the smoothness of the polished surface is hardly affected.

The precursor of the present invention, the process for molding the precursor, and the process for producing an amorphous carbon molded article using the precursor are described hereinafter.

The precursor according to the present invention is a transparent molded article having no visible voids. Such a transparent molded article could not be obtained by molding techniques other than compression molding, i.e., kneading followed by shaping under a highly flowing state, such as transfer molding, injection molding, injection compression molding, and extrusion.

As the metallic substance content and the number of voids of 100 µm or greater in diameter in a precursor increase, the metallic substance content and the number of voids of 100 µm or greater in the resulting amorphous carbon molded article increase nearly proportionally, while the light transmittance of the precursor decreases nearly proportionally. Therefore, the measurement of the light transmittance of the precursor allows one to estimate the metal content and the void existence in an amorphous carbon molded article.

The terminology "light transmittance" as used herein means a percentage of the intensity of transmitted light to that of incident light of 800 nm through a 1 mm thick sample (hereinafter simply referred to as transmittance). Transmittance is not only a quantitative indication of transparency of a substance but a measure of the purity of the substance.

The transmittance of a precursor, even having perfect purity, does not exceed 95% due to the existence of molecular light absorbing substances, such as a quinoid by-product. In other words, the difference of a measured transmittance from the transmittance of 95% represents the optical loss by absorption or scatter due to fine impurities or fine voids. A precursor whose transmittance is less than 80% indicates the existence of an amorphous carbon molded article with significant defects on its polished surface.

Because the precursor of the present invention is a molded article obtained by kneading and shaping a molten phenolic resin under a highly flowing state, its structure is homogeneous, hardly showing microscopic unevenness of structure or physical properties, such as grain boundaries and local strains, when compared with a conventional phenolic resin molded article obtained by sintering, such as compression molding. Therefore, an amorphous carbon molded article obtained by burning into carbonization of the precursor of the present invention also has a homogeneous structure with no grain boundary. To have no grain boundary means that a polished surface of an amorphous carbon molded article in its field of vision under electron microscope examination reveals no boundaries such as the irregular network pattern originating from the contour of the boundary of particulate phenolic resin such that is formed when the precursor is formed by compression molding.

Such excellent homogeneity of the amorphous carbon molded article is also manifested in the surface texture, giving a surface with excellent smoothness. Even shaped into a thin sheet, it hardly suffers from deformation or distortion.

The terminology "comprises a homogeneous phenolic resin homogenized by molding under a highly flowing state" with respect to the precursor means that the precursor comprises a homogenous phenolic resin formed by subjecting a molten phenolic resin to a molding under a highly flowing state such as (1) high flowing transfer molding and (2) kneading followed by injection or extrusion molding under a highly flowing state. This characteristic of the precursor can be confirmed by inexistence of the grain boundary observed on the polished surface or rupture section of the amorphous carbon molded article prepared by burning the precursor by the process of the present invention.

The phenolic resin molding material which can be used in the present invention comprises a particulate phenolic resin having a particle size of not less than 50 µm and a thermal plasticity of from 60 to 160 mm as measured by the disc cure method, the individual particles thereof being coated with 0.2 to 5% by weight, based on the phenolic resin, of a low-surface tension substance having a melting point of from 30° to 160° C. The terminology "particle size" as used herein means an average maximum particle diameter (a diameter of a circumscribed sphere). If the particle size is less than 50 µm, the phenolic resin cannot be fed stably to a molding machine. There is no particular upper limit of the particle size. A practical particle size is from 100 to 400 µm.

The particulate phenolic resin may have any shape, for example, a spherical shape, a cylindrical shape or a cubic shape. When the particle size is small, spherical particles are preferred for their excellent transportability during molding.

The terminology "thermal plasticity" as used herein means a characteristic of the phenolic resin indicating that the resin is solid at ambient temperature, but exhibits fluidity under load and heat. Unlike general thermoplastic resins, a resin having thermal plasticity exhibits self-curing properties so that continuous heating for a certain period of time at a temperature at which thermal plasticity is manifested results in initiation of intramolecular and/or intermolecular condensation allowing formation of a crosslinked structure and self-curing.

Thermal plasticity can be quantitatively expressed in terms of the disc flow (extension of a diameter: mm) of a sample resin under a prescribed load at 160° C. as measured in accordance with the disc cure method specified in JIS (hereinafter described in detail). Resins having a thermal plasticity of less than 60 mm have poor moldability. Those having a thermal plasticity exceeding 160 mm require a longer time for a curing reaction, resulting in poor productivity, and water, etc. that is by-produced by the curing reaction will be entrapped in the molded article, leading to defects of the resulting amorphous carbon molded article after burning into carbonization.

The particulate phenolic resin can preferably be prepared by a method comprising suspension polymerizing a novolak resin in an aqueous medium in the presence of an alkali catalyst also serving as a methylene crosslinking agent, such as hexamethylenetetramine, and a suspension stabilizer (self-curing modified novolak resin method) as disclosed in JP-A-4-159320 (the term "JP-A" as used herein means an "unexamined published Japanese patent application") or by a method comprising suspension polymerizing phenol and formaldehyde in an aqueous medium in the presence of a basic catalyst and a suspension stabilizer (solid resol resin method). These methods provide fine spherical particles having extremely high purity and nearly true spherical shape. A molding material having a large particle size can be effectively obtained by granulating the thus prepared fine particles to a desired particle size.

The low-surface tension substance which can be used for covering (i.e., coating) the phenolic resin particles is a low-melting compound having a melting point of from 30° to 160° C. which is solid at ambient temperature and, in addition, possessing the characteristics unique to low-surface tension substances (e.g., those having a critical surface tension of not higher than about 35 dyne/cm at ambient temperature (25° C.)), such as lubricity (slip characteristic), mold release properties, and inadhesion. In particular, compounds containing no metal element in the form of, for example, a metal salt, are preferred.

Such low-surface tension substances preferably include compounds containing at least one of the compounds selected from the group consisting of an aliphatic compound having from 4 to 20 carbon atoms in its aliphatic group, an aliphatic compound substituted with three or more fluorine atoms having from 4 to 16 carbon atoms in its aliphatic group, an aliphatic aromatic compound substituted with two or more fluorine atoms having from 1 to 9 carbon atoms in its aliphatic group and having from 5 to 10 carbon atoms in its aromatic group, and an aromatic compound substituted with two or more fluorine atoms having from 5 to 10 carbon atoms in its aromatic group.

Specific examples of suitable low-surface tension substances include aliphatic compounds such as higher fatty acids (e.g., lauric acid, palmitic acid, and stearic acid), higher fatty acid esters (e.g., glycerol monolaurate, ethyl stearate, glycerol monostearate, and sorbitan monostearate), solid fats and oils (e.g., trilaurin, tristearin, and hydrogenated castor oil), higher fatty acid amides (e.g., stearamide and ethylenebisstearamide), higher aliphatic alcohols (e.g., cetyl alcohol and stearyl alcohol), higher aliphatic (meth) acrylates (e.g., stearyl methacrylate and stearyl acrylate), and waxy hydrocarbons (e.g., paraffin wax); aliphatic compounds substituted with fluorine atoms such as polyfluoro-higher fatty acids (e.g., perfluorooctanoic acid and 9H-hexadecafluorononanoic acid), polyfluoro-higher aliphatic sulfonamides (e.g., N-ethylperfluorooctylsulfonamide), polyfluoro-higher aliphatic iodides (e.g., 2-(perfluorooctyl)ethyl iodide and 2-(perfluorodecyl)ethyl iodide), polyfluoro-higher aliphatic alcohols (e.g., 1H,1H,9H-hexadecafluorononanol, 2-(perfluorooctyl)ethanol, and 2-(perfluorodecyl)ethanol), polyfluoro-higher aliphatic (meth)acrylates (e.g., 2-(perfluorodecyl)methyl methacrylate and 1H,1H,11H-eicosafluoroundecyl acrylate), polyfluoro-higher aliphatic hydrocarbons (e.g., perfluorododecane), and polyfluoro-oligomers (e.g., a TFE wax (tetrafluoroethylene telomer such as "Vydax AR" produced by E.I. du Pont de Nemours & Co., Inc.) and a CTFE telomer (chlorotrifluoroethylene telomer such as "Daifloyl #200" produced by Daikin Industries, Ltd.)); aliphatic aromatic compounds substituted with fluorine atoms such as an adduct of 2-(methyl p-hydroxybenzoate) and hexafluoropropene trimer; aromatic compounds substituted with fluorine atoms such as pentafluorobenzamide; derivatives of these compounds; and mixtures of two or more thereof.

The phenolic resin molding material of the present invention is a particulate composite material comprising the above-mentioned phenolic resin particles coated with the above-mentioned low-surface tension compound of an amount of from 0.2 to 5% by weight, preferably from 0.3 to 3% by weight, based on the phenolic resin.

If the amount of the coating low-surface tension compound is less than 0.2% by weight, the molding material tends to clog the cylinder of the molding machine, making it difficult to conduct molding continuously. When it exceeds 5% by weight, no further improvement in moldability results, and it tends to be difficult to obtain a transparent molded article.

It is preferable that the low-surface tension compound should be distributed among individual particles as uniformly as possible with a uniform coating film thickness.

Recommended methods for coating the particulate phenolic resin with the low-surface tension compound in the prescribed amount include a method in which both compounds are mixed by stirring in a blender equipped with a heating means, while heating at a prescribed temperature of from the melting point of the low-surface tension compound to the softening point of the particulate phenolic resin; a method comprising stirring both compounds in a fluidized bed at the prescribed temperature described above; and a method comprising dissolving the low-surface tension compound in a solvent incapable of dissolving the particulate phenolic resin but capable of dissolving the low-surface tension compound, adding the particulate phenolic resin to the solution, and removing the solvent from the mixture by distillation, followed by drying.

It is essential that the water content of the phenolic resin molding material be adjusted to 1% by weight or less at least at the time of molding, as hereinafter described in detail. In general, a phenolic resin produced by polymerization has a water content of several percent by weight. The phenolic resin so produced is dried in advance so as to reduce its water content to 1% by weight or less, and then coated with a low-surface tension compound. Drying of the particulate phenolic resin is preferably carried out by heating to 60° to 120° C. in vacuo or in circulating dry air. It is also efficient to simultaneously conduct coating of the particulate phenolic resin with a low-surface tension compound and drying of the phenolic resin.

Covered with the low-surface tension compound having water repellency and low moisture permeability, the thus prepared phenolic resin molding material is able to keep its initially adjusted water content for a long time. For use on an industrial scale, however, the molding material is preferably stored in a closed container or a sealed container until use for the sake of quality control.

It is also possible to coat the undried particulate phenolic resin as produced with a low-surface tension compound. In this case, the coated phenolic resin is thoroughly dried immediately before molding to reduce its water content to 1% by weight or less, and then subjected to molding under such conditions so as to prevent moisture absorption.

The phenolic resin molding material of the present invention can be subjected to molding under a highly flowing state by transfer molding, injection molding, injection compression molding, extrusion, and like technique under generally employed conditions to provide a transparent and substantially void-free precursor.

As stated above, the phenolic resin molding material to be used has a water content of not more than 1% by weight, preferably not more than 0.2% by weight. If the water content exceeds 1% by weight, there are tendencies that voids are formed and remain in the resulting molded article and that, under some molding conditions, the molding material may undergo deterioration by, for example, hydrolysis.

In conventional molding under a highly flowing state (e.g., transfer molding, injection molding or extrusion) of a particulate phenolic resin molding material having thermal plasticity, usually a filler and/or a fibrous reinforcing material and, if necessary, a metal-containing organic lubricant in molding is used. However, these molding assistants should not be used in the production of an amorphous carbon molded article precursor in order to meet the aforesaid demands for high performance. An attempt to mold a conventional phenolic resin molding material without using these assistants would result in a disturbance of the solid transportation of the molding material in a solid transportation zone and/or in a disturbance of feeding and kneading in a heating zone, which could result in the failure to carry on molding in a satisfactory manner. On the other hand, if a mere dry blend of a powdered low-surface tension substance as used in the present invention, and a phenolic resin molding material is molded in the same manner, the blend would suffer from phase separation between the low-surface tension substance and the phenolic resin while passing from the solid transportation zone to the heating zone because the melting point of the former is lower than that of the latter. It follows that the molding system would become instable, leading to molding defects, such as entrapment of air bubbles.

On the other hand, since the phenolic resin molding material according to the present invention comprises phenolic resin particles each coated uniformly with a highly lubricating low-surface tension substance, the coating substance exerts a slip effect and a fluidity improving effect to help smooth solid transportation, melting, and kneading of the resin, and dispersion of the low-surface tension substance, without causing phase separation. As a result, incorporation of air bubbles into the molded article hardly occurs, i.e., less than one void having a diameter of 100 μm or greater per $cm^3$ is included, and the resulting molded article is homogeneous. Further, the low-surface tension substance forms a coating film on the surface of the molded article to thereby improve mold release properties upon removal of the molded article from the mold. These improving effects synergistically achieve stable and uniform molding in a continuous manner. Thus, the resulting molded article, i.e. precursor, contains no visible air bubbles and has accurate dimensions with extremely small scatter of quality among shots.

The low-surface tension substance is either evaporated or gasified after being decomposed, during burning of the precursor, and thus removed from the molded article, so that it never remains in the resulting amorphous carbon molded article.

While the phenolic resin molding material of the present invention may be molded by compression molding too which has been predominantly employed for conventional phenolic resin molding materials, molding under a highly flowing state techniques may be employed, such as transfer molding, injection molding, and extrusion, which have been difficult to carry out in the past. In this respect, the phenolic resin molding material of the present invention is a very advanced molding material.

From the viewpoint of the precursor moldings obtained, a molding utilizing compression molding is produced by melting the particulate phenolic resin followed by fusing the molten resin as such into one body without involving any homogenizing step, such as kneading, similar to sintering, whereas the precursor molding of the present invention, utilizing molding under a highly flowing state is produced by completely melting the particulate phenolic resin and homogenizing the molten resin through high-speed flow (in the case of transfer molding) or kneading (in the case of injection molding or extrusion). Therefore, the precursor molding of the present invention, utilizing molding under a highly flowing state is homogeneous and has a uniform chemical structure. Additionally, the precursor of the present invention can easily be formed into complicated shapes, and high productivity can be assured.

Further, compared with compression molding, since the molding method of the present invention consists of filling a mold with a low-viscosity fluid at a high speed, under a high pressure, while controlling the injection pressure, the resulting precursor has high dimensional precision with excellent reproducibility.

The thus obtained precursor is put in a burning furnace and carbonized by burning in vacuo or in an inert gas atmosphere to provide an amorphous carbon molded article. Burning is preferably carried out by elevating the furnace temperature at a rate of temperature rise of 5° C./hr from room temperature up to 250° C., 3° C./hr from 250° C. to 600° C., and about 10° C./hr from 600° C. to the final heating temperature, maintaining the final heating temperature for a period of from 80 to 160 hours, and then cooling to room temperature. The final burning temperature is suitably from 1200° to 1600° C.

The amorphous carbon molded article obtained by burning into carbonization of the precursor formed by utilizing molding under a highly flowing state can be used as such. For special uses where an especially high dimensional precision, or an especially high surface smoothness is demanded, the surface of the carbonized molded article is subjected to polishing. For uses where such impurities as metallic substances should be extremely reduced, the carbonized molded article is subjected to purification treatment by removing ash with a gas or liquid capable of dissolving a metallic substance, such as hydrochloric acid. Typical examples of such uses include plasma etchers, susceptors, and substrates of magnetic discs used in the electronic industry. In these applications, existence of voids and metallic substances on the surface should be strictly limited.

The amorphous carbon molded article obtained by the process of the present invention contains no visible voids, has an extremely low metal content, and assumes homogeneity on the surface and in the inside, thereby exhibiting high purity and excellent surface processability. Accordingly, the amorphous carbon molded article of the present invention is useful for various applications such as crucibles or Raschig rings in the fields of metallurgical and chemical industries and as plasma etchers, susceptors or substrates of magnetic discs in the electronic industry field. In addition, obtainable by molding techniques under a highly flowing state, such as transfer molding, injection molding, injection compression molding and extrusion, which are highly productive and highly precise as compared with a conventionally prevailing compression molding method, the amorphous carbon molded article of the present invention is of high quality, while inexpensive, and may have a wide variety of shapes.

The precursor according to the present invention is inexpensive, excellent in various characteristics, such as heat resistance, rigidity, hardness, insulating properties, and chemical resistance, and transparent. Therefore, it is suited for use not only as a precursor of an amorphous carbon molded article, as hereinabove illustrated, but also as an optical part, a container, a window material, etc.

The present invention will now be illustrated in greater detail with reference to the following Examples, but it should be understood that the present invention should not be construed as being limited thereto. All the parts and percents are by weight unless otherwise indicated.

REFERENCE EXAMPLE 1

A novolak resin ("#600" produced by Mitsui Toatsu Chemicals, Inc.) (150 parts) was melted at 160° C. and poured into 220 parts of hot water at 90° C. having dissolved therein 1 part of completely saponified polyvinyl alcohol (degree of polymerization: about 2000) while stirring to prepare a suspension. A solution of 24 parts of hexamethylenetetramine in 40 parts of warm water was added to the suspension, and the stirring was continued for an additional period of 20 minutes at the same temperature to conduct suspension polymerization. After completion of the reaction, the suspension was subjected to solid-liquid separation. The solid collected was dried spontaneously to obtain a particulate phenolic resin. By this method, Resins 1 to 8 were prepared to obtain the target values of HPF shown in Table 1. The physical properties of Resins 1 to 8 measured by the following methods are shown in Table 1 below.

1) Thermal Plasticity (Hereinafter Abbreviated as HPF)

Measured in accordance with the disc flow test method specified in JIS-K-6911 5.3.2 (1979) (Molding material (disc method)). A sample weighing 2 g was hot pressed at 160° C. under a load of 1145 kg for 1 minute, and the diameter of the thus formed disc (an average of the maximum diameter and the minimum diameter) was measured.

2) Average Particle Size

A sample was spread on a glass plate and had its micrograph taken. Particle diameter each of 100 particles arbitrarily chosen was measured and averaged.

3) Water Content

A sample weighing 10 g was heated at 80° C. for 30 minutes by means of an infrared heater, and the weight loss was measured.

TABLE 1

| Resin No. | HPF Target Value (mm) | HPF Obsd. Value (mm) | Average Particle Size (μm) | Water Content (wt %) |
| --- | --- | --- | --- | --- |
| 1 | 45 | 45 | 260 | 2.3 |
| 2 | 65 | 63 | 258 | 2.0 |
| 3 | 85 | 86 | 273 | 2.4 |
| 4 | 105 | 104 | 264 | 2.4 |
| 5 | 125 | 127 | 249 | 2.1 |
| 6 | 145 | 144 | 262 | 2.2 |
| 7 | 155 | 156 | 245 | 1.9 |
| 8 | 165 | 168 | 250 | 2.1 |

REFERENCE EXAMPLE 2

A phenolic resin having an HPF of 145 mm, an average particle size of 138 μm, and a water content of 2.3% was prepared in the same manner as in Reference Example 1, except for increasing the completely saponified polyvinyl alcohol to 1.5 parts by weight. The resulting phenolic resin was classified using a sieve having a mesh size of 50 μm, 100 μm or 150 μm to obtain a fraction of 50 μm or under (Resin 9), a fraction of from 50 to 100 μm (Resin 10), a fraction of from 100 to 150 μm (Resin 11), and a fraction of 150 μm or over (Resin 12). Resin 9 was granulated to obtain cylindrical pellets of 2 mm in diameter and 3 mm in length (Resin 13). The physical properties of Resins 9 to 13, as measured in the same manner as in Reference Example 1, are shown in Table 2 below.

TABLE 2

| Resin No. | HPF Target Value (mm) | HPF Obsd. Value (mm) | Average Particle Size (μm) | Water Content (wt %) |
|---|---|---|---|---|
| 9 | 145 | 139 | 41 | 2.0 |
| 10 | 145 | 137 | 73 | 2.2 |
| 11 | 145 | 139 | 120 | 2.3 |
| 12 | 145 | 138 | 188 | 2.3 |
| 13 | 145 | 137 | 2 mmφ × 3 mm | 2.1 |

Each of the particulate phenolic resins of Resins 1 to 13 was mixed with the low-surface tension substance shown in Table 3 below in a blender equipped with a heating jacket at 100° C. to coat the resin particles with the low-surface tension substance, and then dried in air at 70° C. at a relative humidity of 2% or lower to prepare a phenolic resin molding material.

EXAMPLES AND COMPARATIVE EXAMPLES

Each of the phenolic resin molding materials prepared from Resins 1 to 13 was molded in a Model EM35-25KS-10 injection molding machine, manufactured by Matsuda Seisakusho K.K., at a cylinder temperature of 120° C., a mold temperature of 170° C., and an injection pressure of from 70 to 150 kg/cm$^2$ in a disc weighing 20 g and having a diameter of 100 mm and a thickness of 2 mm (Run Nos. 1 to 26). All of the resulting moldings are the precursor of the amorphous carbon molded article according to the present invention.

The phenolic resin molding material prepared from Resin 7 was compression molded by means of a Model NF-70 hot press, manufactured by Shinto Kinzoku Kogyo K.K., at a pressing temperature of 180° C. under a compression molding pressure of 200 kg/cm$^2$ to obtain a disc of 60 mm in diameter, 3 mm in thickness, and 7 g in weight (Run Nos. 27 and 28). This molding is a conventional type precursor for an amorphous carbon molded article.

Each of the precursors was burned in a resistive heating type vacuum sintering furnace ("Model FVS-R", manufactured by Fuji Denpa Kogyo K.K.) by heating at a rate of temperature rise of 5° C./hr up to 250° C., 3° C./hr from 2500° C. up to 600° C., and 10° C./hr from 600° C. up to 1200° C. and maintaining at the final burning temperature, 1200° C., for 160 hours, followed by cooling to room temperature to obtain an amorphous carbon molded article.

The surface of the amorphous carbon molded article was polished with a Model 24BTAW single side polishing machine, manufactured by Speedfam Co., Ltd., using a Fujimi Diamond Paste to a surface roughness (Ra) of not more than 1 μm as measured with a SE3AL feeler roughness meter, manufactured by Kosaka Kenkyusho K.K.

The moldability, transmittance, number of voids, and metal content of the precursor, and number of open voids on the surface, grain boundaries on rupture section, and metal content of the amorphous carbon molded article were measured using the standard of evaluation and the method of measurement shown below. The results are shown in Table 3 below.

Samples of Run Nos. 1 to 26 are for the precursor of the present invention and the amorphous carbon molded article obtained therefrom. Samples of Run No. 27 and 28 are for the precursor obtained by conventional compression molding and the amorphous carbon molded article obtained therefrom.

1) Moldability of Precursor

O . . . capable of injection molding on a 90-second shot cycle in a continuous manner.

Δ . . . capable of injection molding but incapable of continuous molding on a 90-second shot cycle.

x . . . incapable of injection molding due to insufficient feeding, plug-up of the cylinder, etc.

2) Light Transmittance of Precursor

The transmittance, defined above, of the disc sample was measured at 25° C. with a Model U-3400 recording spectrophotometer, manufactured by Hitachi, Ltd. An average was obtained from measurements on 10 points per sample.

3) Number of Voids of Precursor

The disc was examined under a stereoscopic microscope (manufactured by Olympus Optical Co., Ltd..; magnification: 300). The number of voids having a diameter of 20 μm or greater per 10 cm$^2$ of the field was counted and converted to a volumetric basis to obtain the number of voids per cm$^3$. An average was obtained from measurements on 10 points per sample.

4) Metal Content of Precursor

The metal content was determined by emission spectroscopic analysis on a I.C.A.P-575 emission spectroscope, manufactured by Nippon Jarrell Ash Co.

The results obtained are not shown in Table 3 because the measurement of every sample was not more than 100 ppm by weight.

1) Number of Open Voids on the Surface of the Amorphous Carbon Molded Article

The polished surface was examined under a stereoscopic microscope (manufactured by Olympus Optical Co., Ltd..; magnification: 300). The number of open voids having a diameter of 20 μm or greater per 10 cm$^2$ of the field was counted to obtain the number of the voids per cm$^2$.

2) Grain Boundaries on Rupture Section of Amorphous Carbon Molded Article

A rupture section was observed under an S-4000 Model of field emission scanning electron microscope (SEM), manufactured by Hitachi, Ltd., and evaluated based on the following standard.

Not observed . . . homogeneous all over the rupture section with no grain boundaries observed.

Observed . . . Grain boundaries among phenolic resin molding material domains were observed all over the rupture section.

3) Metal Content of Amorphous Carbon Molded Article

The metal content was determined as an ash content using an SSH-1 Model electrical furnace, manufactured by Advantec Toyo Kaisha Ltd.

The results obtained are not shown in Table 3 because the measurement of every sample was not more than 200 ppm by weight.

In Table 3, abbreviations for low-surface tension substances used have the following meanings. The melting point of the substance is shown in parentheses.

SMG: Glycerol monostearate (60° C.)
SE: Ethyl stearate (34° C.)
SAL: Stearyl alcohol (56° C.)
SMP: Sorbitan monopalmitate (46° C.)

SAC: Stearic acid (66° C.)
M: Mannitol (166° C.)
SAM: Stearamide (100° C.)

amorphous carbon molded article had open voids on its surface and, also, many voids were observed on the rupture section of the precursor under SEM examination.

TABLE 3

| | | Phenolic Resin Molding Material | | | Phenolic Resin Molded Article | | Amorphous Carbon Molded Article | |
| --- | --- | --- | --- | --- | --- | --- | --- | --- |
| | | Water | Low-Surface Tension Substance | | Transmitt- | Number of | Number of Surface | Grain |
| Run No. | Resin No. | Content (wt %) | Kind | Amount (wt %) | Moldability | ance (%) | Voids (/cm$^3$) | Open Voids (/cm$^2$) | Boundary |
| 1 | 1 | <0.2 | SMG | 0.75 | x | — | — | — | — |
| 2 | 2 | <0.2 | SMG | 0.75 | o | 80 | 0 | 0 | not observed |
| 3 | 3 | <0.2 | SMG | 0.75 | o | 82 | 0 | 0 | not observed |
| 4 | 4 | <0.2 | SMG | 0.75 | o | 86 | 0 | 0 | not observed |
| 5 | 5 | <0.2 | SMG | 0.75 | o | 90 | 0 | 0 | not observed |
| 6 | 6 | <0.2 | SMG | 0.75 | o | 88 | 0 | 0 | not observed |
| 7 | 7 | <0.2 | SMG | 0.75 | o | 83 | 0 | 0 | not observed |
| 8 | 8 | <0.2 | SMG | 0.75 | o | 30 | 6 | 2 | not observed |
| 9 | 9 | <0.2 | SMG | 0.75 | Δ | 84 | 2 | — | — |
| 10 | 10 | <0.2 | SMG | 0.75 | o | 81 | 0 | 0 | not observed |
| 11 | 11 | <0.2 | SMG | 0.75 | o | 91 | 0 | 0 | not observed |
| 12 | 12 | <0.2 | SMG | 0.75 | o | 87 | 0 | 0 | not observed |
| 13 | 13 | <0.2 | SMG | 0.75 | o | 84 | 0 | 0 | not |
| 14 | 7 | <0.2 | SMG | 0.1 | x | — | — | — | — |
| 15 | 7 | <0.2 | SMG | 0.3 | o | 86 | 0 | 0 | not observed |
| 16 | 7 | <0.2 | SMG | 1.0 | o | 82 | 0 | 0 | not observed |
| 17 | 7 | <0.2 | SMG | 3.0 | o | 81 | 0 | 0 | not observed |
| 18 | 7 | <0.2 | SMG | 6.0 | o | 68 | 0 | — | — |
| 19 | 7 | 0.4 | SMG | 0.75 | o | 80 | 0 | 0 | not observed |
| 20 | 7 | 3.0 | SMG | 0.75 | o | 34 | 18 | 4 | not observed |
| 21 | 7 | <0.2 | SE | 0.75 | o | 83 | 0 | 0 | not observed |
| 22 | 7 | <0.2 | SAL | 0.75 | o | 87 | 0 | 0 | not observed |
| 23 | 7 | <0.2 | SMP | 0.75 | o | 85 | 0 | 0 | not observed |
| 24 | 7 | <0.2 | SAC | 0.75 | o | 84 | 0 | 0 | not observed |
| 25 | 7 | <0.2 | M | 0.75 | x | — | — | — | — |
| 26 | 7 | <0.2 | SAM | 0.75 | o | 81 | 0 | 0 | not observed |
| 27 | 7 | <0.2 | SMG | 0.75 | — | 81 | 0 | 0 | observed |
| 28 | 7 | <0.2 | SMG | 0.75 | — | 82 | 0 | 0 | observed |

As can be seen from Table 3 in view of Tables 1 and 2, samples of Run Nos. 1, 8, 9, 14, 18, 20, 25, 27, and 28, which are the Comparative Examples, turned out to have their several disadvantages as discussed below.

In Run No. 1, since the HPF of Resin 1 used in the phenolic resin molding material was as low as 45 mm, the molding material had poor fluidity to cause plug-up in the injection cylinder and could not be injection molded.

In Run No. 8, HPF of Resin 8 exceeding 160 mm, injection was carried out satisfactorily. However, even after the surface layer of the molded article had cured in the mold, condensation proceeded in the inside, resulting in formation of many voids in the inside of the precursor. As a result, the In Run No. 9, the particulate phenolic resin used had a particle size of smaller than 50 μm so that the molding material could not be injection molded in a continuous and stable manner due to insufficient feeding.

In Run No. 14, the amount of the low-surface tension substance was less than 0.2% by weight so that the molding material could not be injection molded due to plug-up in the cylinder.

In Run No. 18, the low-surface tension substance used in an amount exceeding 5% by weight impaired the transparency of the resin molded article, making evaluation of voids of the precursor difficult.

In Run No. 20, the high water content in the phenolic resin molding material, exceeding 1% by weight, resulted in formation of a vast number of voids in the resin molded article. Similarly, a number of voids were observed on the rupture section of the amorphous carbon molded article under SEM examination.

In Run No. 25, the low-surface tension substance having a melting point of 166° C. was incapable of uniformly coating the phenolic resin particles on drying. Additionally, the molding material was hardly melted when subjected to injection molding, failing to exhibit sufficient moldability.

In Run Nos. 27 and 28, the phenolic resin molding material was molded by compression molding. Each amorphous carbon molded article obtained by burning showed grain boundaries all over the rupture section, which considered to be derived from the boundaries in the precursor, revealing a non-uniform structure of the amorphous carbon molded article.

While the invention has been described in detail and with reference to specific examples thereof, it will be apparent to one skilled in the art that various changes and modifications can be made therein without departing from the spirit and scope thereof.

What is claimed is:

1. A process for producing an injection molded phenolic resin article containing no filler, wherein said article has a light transmittance of not less than 80% per mm of optical pass of visible light having a wavelength of 800 nm, has less than one void having a diameter of 100 µm or greater per cm$^3$, and has a metal content of not more than 200 ppm by weight, which comprises the following steps:

(a) molding a self-curing particulate phenolic resin by injection molding or injection compression molding at a sufficient temperature to cure said phenolic resin under a pressure of from 70 kg/cm$^2$ to 150 kg/cm$^2$, and controlling the water content of said phenolic resin to 1% by weight or less, and (b) producing the phenolic resin article having a metal content of not more than 200 ppm by weight, wherein said particulate phenolic resin has a particle size of not less than 50 µm, and a thermal plasticity of from 60 to 160 mm, as measured by the disc cure method, and wherein the individual particles thereof are coated with 0.2 to 5% by weight, based on the phenolic rein, of a metal-free low-surface tension compound having a melting point of from 30° to 160° C.

2. An injection molded phenolic resin article containing no filler, wherein said article has a light transmittance of not less than 80% per mm of optical pass of visible light having a wavelength of 800 nm, has less than one void having a diameter of 100 µm or greater per cm$^3$, has a metal content of not more than 200 ppm by weight, and wherein said article is produced by a process comprising the following steps:

(a) molding a self-curing particulate phenolic resin by injection molding or injection compression molding at a sufficient temperature to cure said phenolic resin under a pressure of from 70 kg/cm$^2$ to 150 kg/cm$^2$, and controlling the water content of said phenolic resin to 1% by weight or less, and (b) producing the phenolic resin article having a metal content of not more than 200 ppm by weight, wherein said particular phenolic resin has a particle size of not less than 50 µm, and a thermal plasticity of from 60 to 160 mm, as measured by the disc cure method, and wherein the individual particles thereof are coated with 0.2 to 5% by weight, based on the phenolic resin, of a metal-free low-surface tension compound having a melting point of from 30° to 160° C.

3. An injection molded phenolic resin article containing no filler, wherein said article has a light transmittance of not less than 80% per mm of optical pass of visible light having a wavelength of 800 nm, has less than one void having a diameter of 100 µm or greater per cm$^3$, has a metal content of not more than 300 ppm by weight, and wherein said article is produced by a process comprising the following steps:

(a) molding a self-curing particulate phenolic resin by injection molding or injection compression molding at a sufficient temperature to cure said phenolic resin under a pressure of from 70 kg/cm$^2$ to 150 kg/cm$^2$, and controlling the water content of said phenolic resin to 1% by weight or less, and (b) producing the phenolic resin article having a metal content of not more than 300 ppm by weight, wherein said particular phenolic resin has a particle size of not less than 50 µm, and a thermal plasticity of from 60 to 160 mm, as measured by the disc cure method, and wherein the individual particles thereof are coated with 0.2 to 59 by weight, based on the phenolic resin, of a metal-free low-surface tension compound having a melting point of from 30° to 160° C.

4. A process for producing an injection molded phenolic resin article as claimed in claim 3, which comprises:

(a) molding a self-curing particulate phenolic resin by injection molding or injection compression molding at a sufficient temperature to cure said phenolic resin under a pressure of from 70 kg/cm$^2$ to 150 kg/cm$^2$, and controlling the water content of said phenolic resin to 1% by weight or less, and (b) producing the phenolic resin article having a metal content of not more than 300 ppm by weight, wherein said particulate phenolic resin has a particle size of not less than 50 µm, and a thermal plasticity of from 60 to 160 mm, as measured by the disc cure method, and wherein the individual particles thereof are coated with 0.2 to 5% by weight, based on the phenolic resin, of a metal-free low-surface tension compound having a melting point of from 30° to 160° C.

* * * * *